US006592804B1

(12) United States Patent
Gauri

(10) Patent No.: US 6,592,804 B1
(45) Date of Patent: Jul. 15, 2003

(54) METHOD AND APPARATUS FOR FORMING GREEN CERAMIC ARC TUBES USING PRESSURIZED FLUID ASSISTED INJECTION MOLDING

(75) Inventor: Vishal Gauri, Lyndhurst, OH (US)

(73) Assignee: General Electric Company, Schenectady, NY (US)

( * ) Notice: Subject to any disclaimer, the term of this patent is extended or adjusted under 35 U.S.C. 154(b) by 430 days.

(21) Appl. No.: 09/583,667

(22) Filed: May 30, 2000

(51) Int. Cl.[7] ................................................ B29D 23/00

(52) U.S. Cl. ....................... 264/570; 264/572; 264/573; 264/632; 264/634

(58) Field of Search ................................ 264/570, 572, 264/573, 632, 634

(56) References Cited

U.S. PATENT DOCUMENTS

| | | | | |
|---|---|---|---|---|
| 4,387,067 A | | 6/1983 | Kobayashi et al. | |
| 4,451,418 A | | 5/1984 | Furuta et al. | 264/63 |
| 5,753,174 A | * | 5/1998 | Shimizu et al. | 264/513 |
| 5,798,066 A | * | 8/1998 | Uram | 264/572 |

OTHER PUBLICATIONS

V. Gauri et al., J. Non–Newtonian Fluid Mech. 83, pp. 183–203 (1999).

A.J. Poslinski et al., "Isothermal Gas–Assisted Displacement of Viscoplastic Liquids in Tubes", Polymer Engineering and Science, Mid–Jun. 1995, vol. 35, No. 11, pp. 877–892.

G.A.A.V. Haagh et al., "Towards a 3–D Finite Element Model for the Gas–Assisted Injection Moulding Process", Intern. Polymer Processing XII (1997) 3 ©Hanser Publishers, Munich 1997.

E. I. Shen, "A Finite Element Study of Low Reynolds Number Two–Phase Flow in Cylindrical Tubes", Journal of Applied Mechanics, Jun. 1985, vol. 52., pp. 253–256.

L. W. Schwartz et al., "On the motion of bubbles in capillary tubes", J. Fluid Mech. (1986), vol. 172, pp. 259–275.

R.E. Khayat et al., "A three–dimensional boundary–element approach to gas–assisted injection molding", J. Non–Newtonian Fluid Mech., 57 (1995) pp. 253–270.

* cited by examiner

*Primary Examiner*—Suzanne E. McDowell
(74) *Attorney, Agent, or Firm*—Fay, Sharpe, Fagan, Minnich & McKee, LLP

(57) ABSTRACT

A method and apparatus for forming a green ceramic arc tube for a metal halide lamp. A feedstock material comprising ceramic and a binder is prepared and injected into an inner cavity of a mold. The inner cavity of the mold has an inner surface that corresponds to a desired outer shape of a body of the ceramic arc tube. A fluid is injected into the feedstock material to create a cavity in the feedstock material and to force the feedstock material into contact with the inner surface of the mold. The mold is then separated from the formed ceramic green arc tube.

29 Claims, 3 Drawing Sheets

METHOD AND APPARATUS FOR FORMING GREEN CERAMIC ARC TUBES USING PRESSURIZED FLUID ASSISTED INJECTION MOLDING

TECHNICAL FIELD

The present invention relates to a method for forming a green body of a ceramic arc tube used in metal halide lamps, and more particularly, the present invention relates to a method for forming a green body of a shaped ceramic arc tube for use in a metal halide lamp.

BACKGROUND ART

It is known in the prior art to produce ceramic arc tubes for metal vapor discharge lamps by sealing a tubular translucent alumina-based element that is opened at both ends with heat resisting metal or ceramic caps and by sealing discharge electrodes to central holes of the caps. Production of arc tubes constructed in this manner is complicated and the arc tubes have limited life and stability, because the seal between the caps and the tubular element breaks down over time, due to the poor corrosion resistance of the material used to seal the caps to the tubular element. Additionally, the luminous efficiency and color rendition is not optimal in a ceramic arc tube that has a straight tubular shape.

Integrally shaped ceramic arc tubes in which an outer diameter of an arc discharge portion is larger than that of electrode holding end portions has been proposed in the prior art. U.S. Pat. No. 4,451,418 discloses a ceramic green arc tube for a metal vapor discharge lamp where an outer diameter of the arc discharging portion is larger than that of the end portions that hold discharging electrodes. The ceramic green arc tube is produced by preparing a stiff plastic body that consists mainly of a ceramic material and a binder. The stiff plastic body is formed into a straight tubular body by means of an extruder. The tubular body is placed in an inner cavity of a molding dye that has the shape of the desired ceramic arc tube. One end of the formed stiff plastic tubular body is closed and a compressed fluid is applied to the open end of the tubular body. The extruded tubular body is inflated until a central portion of the tubular body contacts an inner surface of the molding die. The inflated body is hardened and dried with the heat of the previously heated molding dye. A ceramic green arc tube is ejected from the mold.

U.S. Pat. No. 4,387,067 discloses a ceramic arc tube of a metal vapor discharge lamp that has a discharge portion with electrode holding end portions integrally formed at opposite ends thereof. The outside diameter of the arc discharge portion is larger than that of the electrode holding end portions. The ceramic arc tube is made by placing a tubular green body in a fusiform cavity of a die, inflating the middle portion of the green body more than the end portions of the green body, and firing the shaped green body to produce a ceramic arc tube.

DISCLOSURE OF THE INVENTION

The present invention concerns a method for forming a green ceramic arc tube for a metal halide lamp. A feedstock material is prepared by mixing alumina with a binder. The feedstock material is injected into an inner cavity of a mold. The inner cavity of the mold has an inner surface that corresponds to a desired outer shape of a body of the ceramic arc tube. An outer diameter of an arc discharging portion of the desired ceramic arc tube body is larger than end portions of the arc tube that hold discharging electrodes. A fluid is injected into the feedstock material to create a cavity in the feedstock material and to force the feedstock material into contact with the inner surface of the mold. The mold is then separated from the formed ceramic green arc tube.

The feedstock material may be comprised of approximately 80% alumina suspended in a binder comprising approximately 18% carnauba wax and 2% stearic acid by weight. The feedstock material may be heated before being injected into the mold to melt the wax and decrease its viscosity. The fluid used to create a cavity in the feedstock and force the feedstock material into contact with an inner surface of the mold, may have a viscosity that is less than the feedstock material. The ratio of viscosity of the feedstock material to the viscosity of the fluid injected to create the cavity may be over 100 to 1. The injected fluid may be a liquid, such as water or a gas such as Nitrogen. Depending on the type of feedstock material, the feedstock material may be heated or cooled after the fluid is injected into it to increase the viscosity and strength of the feedstock material to allow the formed arc tube to be removed from the mold.

The apparatus used to form a green ceramic arc tube according to the method of the present invention includes a mold, a ceramic feedstock injector and a fluid injection unit. The mold has an inner cavity with an inner surface that corresponds to the desired outer surface of the arc tube. The mold may also include a pin that extends into the inner cavity which defines an inner diameter of an end portion of the arc tube. The mold may further include an injector pin coupled to the fluid injector for injecting fluid into the ceramic feedstock material. The mold may include a core pull mechanism for removing the arc tube from the mold. The mold may be comprised of two sections that have opposing surfaces that are transverse to an axis that extends through the cavity and end portions of the formed arc tube. The ceramic feedstock injector has an outlet coupled to a feedstock inlet in the mold. The ceramic feedstock injector is adapted to inject a ceramic feedstock into the mold. The fluid injection unit has a fluid outlet coupled with a fluid inlet of the mold. The fluid outlet of the fluid injection unit may be coupled to an injector pin that injects a fluid into the ceramic feedstock.

The single step process of the present invention allows arc tubes to be produced with significant material and process time savings. Wall thickness distribution can be tailored by varying the heat transfer and rheology of the process. The present invention allows arc tubes to be made in a variety of shapes and sizes with reduced cycle times. The walls of the arc tubes are more tightly packed by exerting pressure through the fluid, which results in fewer defects in the arc tubes.

BEST MODE FOR CARRYING OUT THE INVENTION

Figure 3:
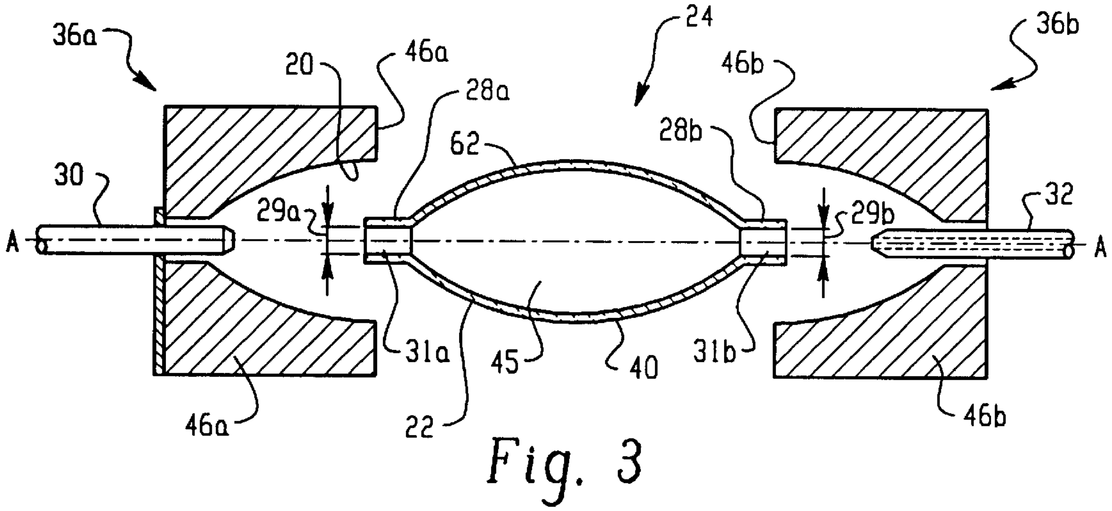
FIG. 3 is a sectional view of a mold pulled away from a formed green ceramic arc tube.
Figure 6:
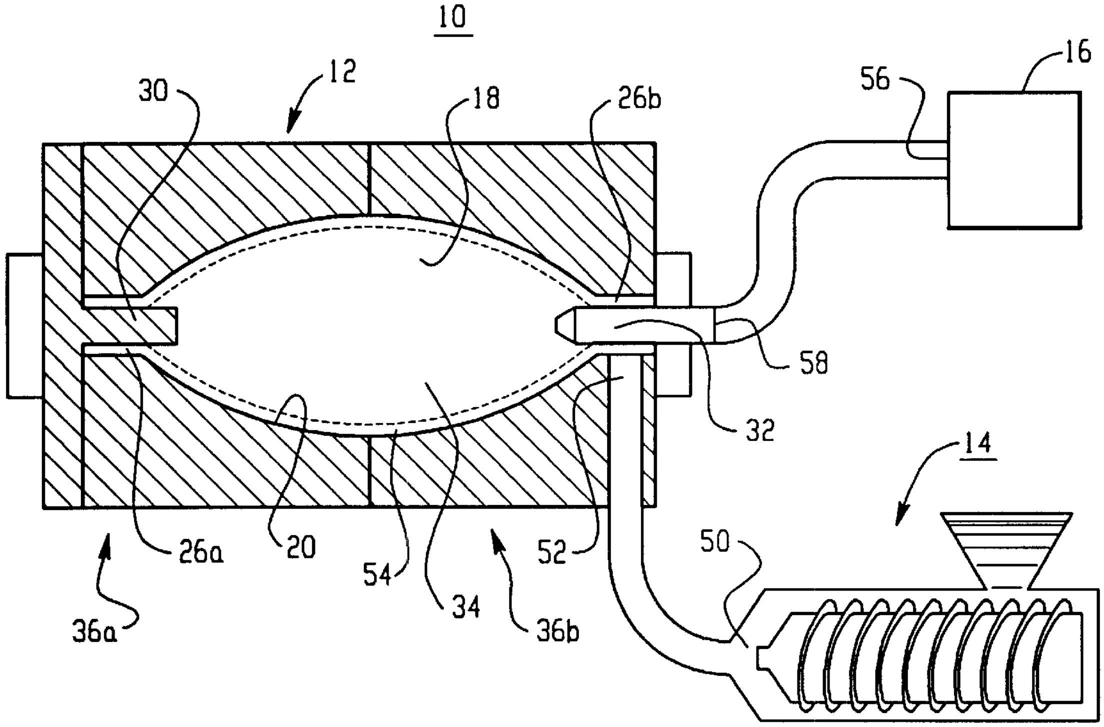
FIG. 6 is a schematic depiction of an arc tube molding system.

The present invention is directed to a method and apparatus for forming a green ceramic arc tube 24 (FIG. 3) for a metal halide lamp (not shown). A green ceramic arc tube molding system 10 is shown in FIG. 6. The molding system 10 includes a mold 12, a ceramic feed stock injector 14 and a fluid injection unit 16. The mold has an inner cavity 18 with an inner surface 20 that corresponds to a desired outer surface 22 of a ceramic arc tube 24. The inner cavity 18 of the mold 12 includes two narrow cylindrical regions 26*a*, 26*b* that correspond to end portions 28*a*, 28*b* of the ceramic arc tube 24. Referring to FIG. 3, the mold 12 includes a pin 30 that extends into the narrow cylindrical region 28*a* to define an inner diameter 29*a* of an opening 31*a* in the end portion 28*a* of the ceramic arc tube 24. The mold 12 also includes an injector pin 32 coupled to the fluid injector for injecting penetrating fluid 34 into the ceramic feed stock 54. The injector pin 32 defines an inner diameter 29*b* of an opening 31*b* in the end portion 28*b* of the ceramic arc tube 24. Tight tolerances on the diameters 29*a*, 29*b* of the openings 31*a*, 31*b* in the end portions 28*a*, 28*b* are required, since the electrodes of the metal halide lamp must fit tightly within the end portions 28*a*, 28*b* of the arc tube 24. The tight tolerances on the inner diameters 29*a*, 29*b* of the openings 31*a*, 31*b* in the mold end portions 28*a*, 28*b* are provided by the pin 30 and the injector pin 32, because the pins 30, 32 do not significantly wear as tubes are made with in the mold 12.

In an alternate embodiment two injector pins are used instead of one injector pin 32 and a solid pin 30. This allows penetrating fluid 34 to be injected into the feedstock material from both ends 36*a*, 36*b* of the mold 12. In yet another embodiment, one injector pin is used to form an opening in a first end portion and an opening is formed in the second end portion by controlling the flow of the penetrating fluid 34 into the feedstock material 54.

Figure 2:
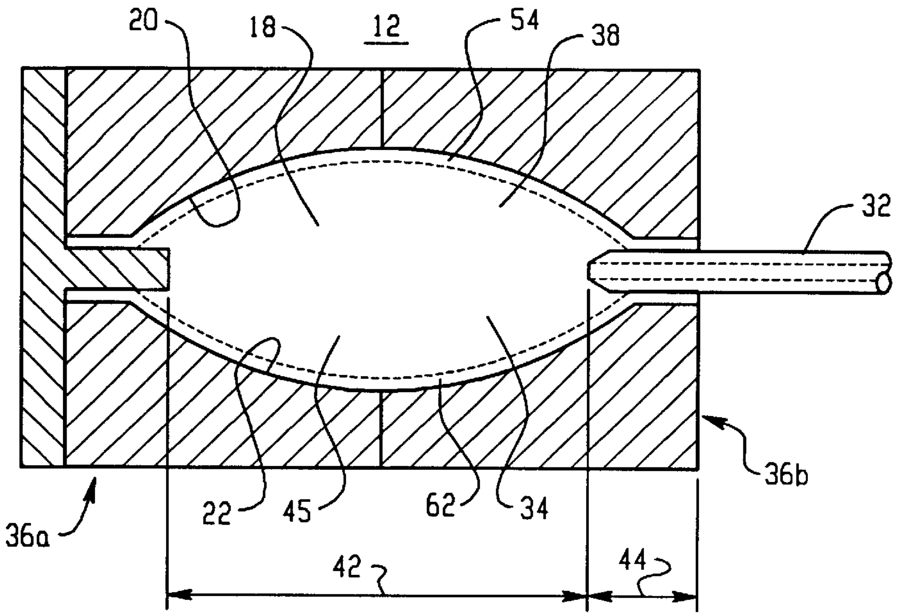
FIG. 2 is a sectional view of a mold having a green ceramic arc tube formed in it.

Referring to FIG. 2, an inner portion 38 of the inner cavity 18 of the mold 12 defines an arc discharging portion 40 of the ceramic arc tube 24. In the exemplary embodiment, the length of the pin 30 and injector pin 32 that extends into the mold 12 is equal to the length of the end portions 28*a*, 28*b* and a gap length 42 between the pins 30, 32 is equal to the length of the arc discharging portion 40. This configuration allows for uniform end portion inner diameter and maximum control over the formation of the arc discharging portion 40. A length 44 the injector pin 32 is inserted can also be adjusted to control the volume of the arc discharging portion inner cavity 45. As shown in FIG. 3, the mold 12 is divided into first and second sections 46*a*, 46*b* that have first and second opposing surfaces 48*a*, 48*b* that are transverse to a center axis A that extends through the inner cavity 18 of the mold 12.

Referring to FIG. 6, the ceramic feedstock injector 14 includes a feedstock outlet 50 that is coupled by means of a conduit to a feedstock inlet 52 of the mold. The feedstock inlet 52 of the mold 12 is near one end 36*b* of the mold, allowing feedstock material 54 to be injected into the narrow cylindrical region 26*b* of the mold 12. The feedstock injector 14 is adapted to inject a ceramic feedstock material 54 into the mold 12. One suitable feedstock material injector is Arburg model #221.

The fluid injection unit 16 has a fluid outlet 56 that is coupled to a fluid inlet 58 of the mold. The fluid inlet 58 of the mold 12 is coupled to the injector pin 32 for injecting penetrating fluid 34 into the feedstock material 54. When injector pins 32 are used at both ends of the mold the fluid outlet 56 of the fluid injection unit is coupled to both injector pins 32. One suitable fluid injection unit is a gas injection unit available from Cinpres Inc.

To form a green body of a ceramic arc tube for a metal halide lamp having an arc discharging portion 40 having an outer diameter that is larger than an outer diameter of the end portions 28*a*, 28*b* that hold discharging electrodes, a feedstock material 54 is prepared. The feedstock material 54 of the exemplary embodiment, is a ceramic powder dispersed in a suitable thermal plastic binder system, which creates a feedstock 54 with desirable rheology. The feedstock 54 constructed in accordance with an exemplary embodiment of the invention consists of 80% by weight sub-micron sized alumina suspended in 18% by weight of a binder consisting of carnauba wax and 2% by weight of stearic acid. The carnauba wax has a melting temperature of about 90° C., above which the feedstock material 54 is liquid-like in nature and can be injected into the mold 12. The feedstock material 54 of the exemplary embodiment displays a non-Newtonian rheology, with a yield stress and shear-thinning nature. The shear-thinning nature of the feedstock can be modified by adjusting the amount of stearic acid relative to the wax in the binder. In the exemplary embodiment, the feedstock material 54 displays a power-law type shear-thinning behavior. The high shear-thinning rheological nature of the feedstock material of the exemplary embodiment reduces the thickness the arc discharging portion walls 62. An increase in the yield stress of the ceramic feedstock material 54 results in a decrease in the wall thickness of the arc tube 24 and a decrease in the yield stress of the ceramic feedstock material 54 results in an increase in the thickness of the walls of the arc tube 24.

Figure 1A:
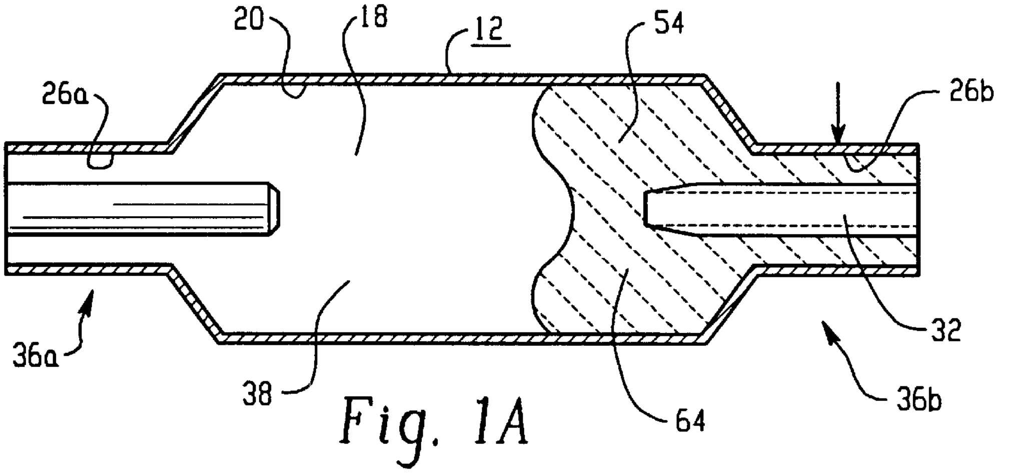
FIG. 1A is a sectional view of ceramic feedstock material in a mold having an injector pin and an end inner diameter pin.

At room temperature, the feedstock material 54 of the exemplary embodiment is very viscous. The feedstock material 54 is heated to a temperature that is moderately higher than the wax melting temperature to reduce the viscosity of the feedstock material 54. Typically, the feedstock material is maintained at 100° C. before being injected into the mold as a short shot 64 (FIG. 1A) or volume of feedstock material 54 that is less than the volume of the inner cavity 18 of the mold 12. The feedstock material 54 is injected into the inner cavity 18 of the mold 12 that has an inner surface 20 that corresponds to the desired shape of the ceramic arc tube 24. Referring to FIGS. 1A and 6, in the exemplary embodiment the feedstock material 54 is injected into the feedstock inlet 52 in the mold that is located near the end 36*b* of the mold 12. The feedstock material 54 is injected into one of the narrow cylindrical regions 26*a*, 26*b* of the mold 12 filling the narrow cylindrical region around the injector pin 32. The short shot 64 of feedstock material 54 fills the narrow cylindrical region 26*b*, and a portion of the inner portion 38 of the mold 12, completely surrounding the injector pin 32.

Figure 1B:
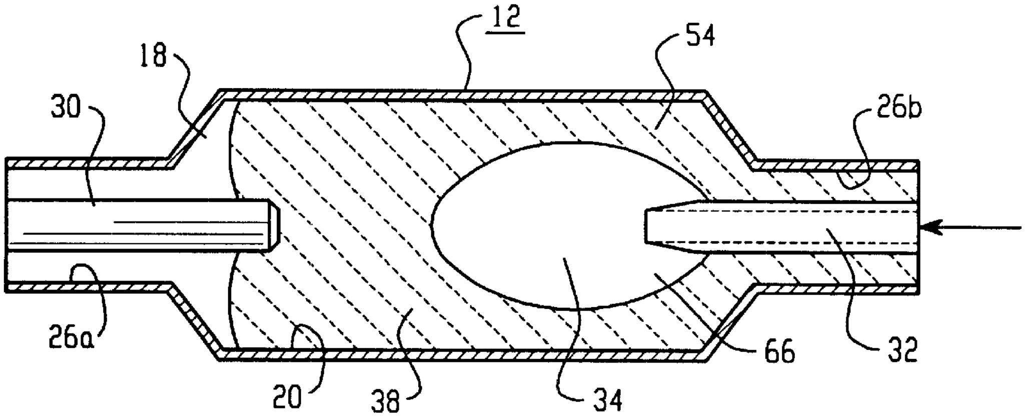
FIG. 1B is a sectional view of fluid being injected into a ceramic feedstock material in a mold.
Figure 1C:
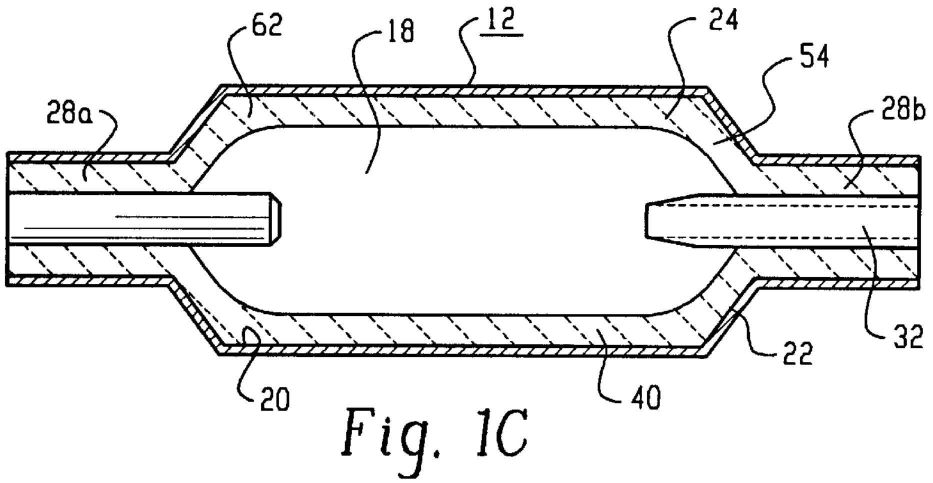
FIG. 1C is a sectional view of a green ceramic arc tube formed in a mold.

Referring to FIG. 1B, a penetrating fluid 34 is injected into the short shot 64 of feedstock material 54 to form a bubble 66 or cavity in the feedstock material 54. As fluid 34 is injected into the feedstock material 54, the feedstock material 54 is forced towards the second end 36*a* of the mold 12. The feedstock material 54 is forced into contact with the inner cavity 18 of the mold 12. As more fluid 34 is injected into the feedstock material 54, the feedstock material 54 is forced into the narrow cylindrical region 26*a* around the pin 30 and into contact with the entire inner surface 20 of the mold 12, as shown in FIG. 1C.

The penetrating fluid 34 can be either gas or liquid, and is very inviscid compared to the feedstock material 54. The penetrating fluid 34 is immiscible in wax. The ratio of viscosity of the feedstock material 54 to the penetrating fluid 34 is over 100 to 1. In the exemplary embodiment, water is used as the penetrating fluid 34. One advantage of using water as the penetrating fluid 34 is that water is incompressible in nature, allowing it to be easily injected at a prescribed flow rate profile. The injection speed of the penetrating fluid 34 is varied through the injection phase. The injection speed profile of the penetrating fluid 34 is controlled to obtain uniform wall thickness. As the injection velocity is increased, the wall thickness increases and subsequently decreases during the process. In the exemplary embodiment, the penetrating fluid 34 is kept at 60° C. to prevent premature freezing or hardening of the feedstock material 54. In an alternate embodiment, compressed air is used as the penetrating fluid. One advantage of using compressed air as the penetrating fluid is that the amount of heat lost during the process is reduced. It should be apparent to those having skill in the art that other suitable fluids can be used as the penetrating fluid.

The feedstock material is then cooled to freeze the feedstock material 54. The mold 12 is maintained at 40° C. which allows safe de-mold of the tube without damage. The feedstock material 54 may be allowed to cool in the mold for a certain amount of time before the penetrating fluid 34 is injected through the inlet 32. This, delay provides an additional control mechanism over the wall thickness in the finished tube by changing the heat transfer characteristics of the process. For smaller wall thicknesses the delay is reduced or eliminated, while for parts having thicker walls the delay time can be increased. The delay causes the viscosity of the feedstock material 54 to increase which causes thicker arc discharge walls 62 to be formed. Since thin walls are desired in ceramic arc tubes, in the exemplary embodiment no delay is employed. It should be apparent to those skilled in the art that thermoset feedstock material can be used that sets as heat is added to the feedstock material. When such a feedstock material is used, heat is applied to the feedstock material 54 to cure the green arc tube 24, before it is removed from the mold.

Referring to FIG. 3, when the feedstock material 54 is sufficiently cooled to freeze the feedstock material or the feedstock material is otherwise cured, the mold 12 is removed from the ceramic green arc tube 24. In the exemplary embodiment, the mold 12 is divided in the middle of the arc discharging portion 60 perpendicular to the arc discharging portion 40. Alternatively, the mold may be split along the axis A of the ceramic green arc tube 24.

Figure 4:
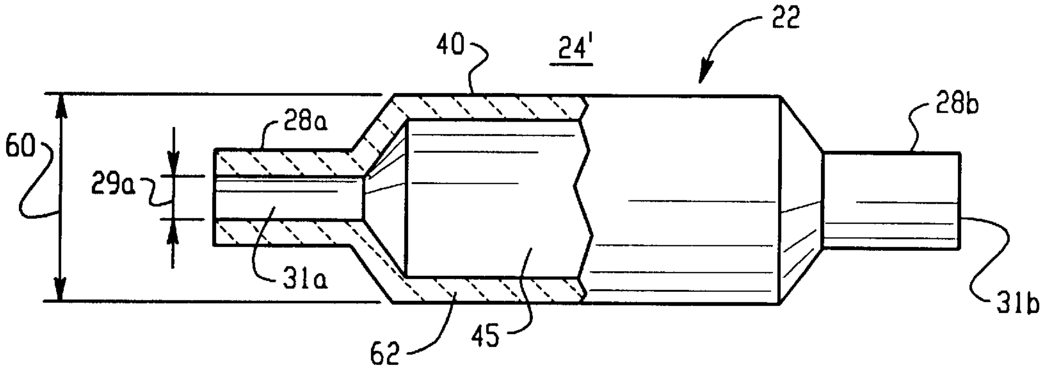
FIG. 4 is a formed ceramic arc tube.
Figure 5:
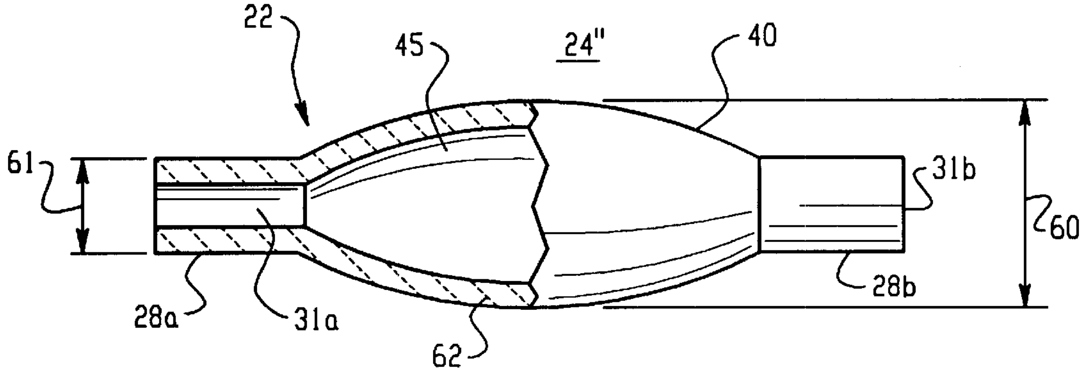
FIG. 5 is an alternate embodiment of a formed ceramic arc tube.

Referring to FIGS. 4 and 5, molds having a variety of different shape inner cavities 18 can be made to produce arc tubes having a variety of shapes and sizes. For example, molds may be created to mold ceramic green arc tubes having the shapes shown in FIGS. 4 and 5.

Although the present invention has been described with a degree of particularity, it is the intent that the invention include all modifications and alterations falling within the spirit or scope of the appended claims.

I claim:

1. A method for forming a green ceramic arc tube for a metal halide lamp, comprising:

a) preparing a feedstock material comprising ceramic and a binder;

b) injecting said feedstock material into an inner cavity of a mold having an inner surface corresponding to a desired outer shape of a body of said ceramic arc tube, wherein an outer diameter of an arc discharging portion is larger than that of end portions of the arc tube which hold discharging electrodes;

c) injecting a fluid into said feedstock material to create a cavity in said feedstock material and force said feedstock material into contact with said inner surface of said mold, wherein a ratio of said viscosity of said feedstock material to said viscosity of said fluid is at least 100 to 1; and d) separating said mold from the ceramic green arc tube.

2. The method of claim 1 wherein said fluid has a viscosity that is less than a viscosity of said feedstock material.

3. The method of claim 1 wherein said fluid is a liquid.

4. The method of claim 1 wherein said fluid is water.

5. The method of claim 1 wherein said feedstock material is comprised of approximately 80% alumina suspended in a binder comprising approximately 18% carnauba wax and 2% stearic acid by weight.

6. The method of claim 1 wherein an inner diameter of an end portion of said arc tube is defined by a pin that extends into said mold.

7. The method of claim 1 further wherein said fluid is injected into said feedstock material through an injection pin.

8. The method of claim 1 further comprising heating said feedstock material before injecting said feedstock material into said mold.

9. The method of claim 1 further comprising cooling said mold to increase a viscosity of said feedstock material to allow said formed arc tube to be removed from said mold.

10. The method of claim 1 further comprising heating said mold to increase a viscosity of said feedstock material to allow said formed arc tube to be removed from said mold.

11. The method of claim 1 wherein said feedstock material comprises alumina and a binder.

12. A method for forming a green body of a ceramic green arc tube for a metal halide lamp wherein an outer diameter of an arc discharging portion is larger than that of end portions of the arc tube which bold discharging electrodes, comprising:

a) preparing a feedstock material comprising alumina and a binder, said feedstock material having an associated viscosity;

b) heating said feedstock material to reduce said viscosity;

c) injecting said feedstock material into an inner cavity of a mold having an inner portion corresponding to a desired outer shape of said ceramic arc tube;

d) injecting a fluid into said feedstock material to create a cavity in said feedstock and force said feedstock material into contact with said inner cavity of said mold, said cavity in said feedstock being in communication with a pin that defines an inner surface in an end portion of said ceramic green arc tube.

e) cooling said feedstock material to freeze said feedstock material; and f) removing said mold to produce a ceramic green arc tube.

13. A method for forming a green ceramic arc tube for a metal halide lamp, comprising:

a) preparing a feedstock material comprising ceramic and a binder;

b) injecting said feedstock material into an inner cavity of a mold having an inner surface corresponding to a desired outer shape of a body of said ceramic arc tube, wherein an outer diameter of an arc discharging portion is larger than that of end portions of the arc tube which hold discharging electrodes;

c) injecting a fluid into said feedstock material through an injection pin to create a cavity in said feedstock material and force said feedstock material into contact with said inner surface of said mold; and d) separating said mold from the ceramic green arc tube.

14. The method of claim 13 wherein said fluid has a viscosity that is less than a viscosity of said feedstock material.

15. The method of claim 13 wherein said fluid is a liquid.

16. The method of claim 13 wherein said feedstock material is comprised of approximately 80% alumina suspended in a binder comprising approximately 18% carnauba wax and 2% stearic acid by weight.

17. The method of claim 13 wherein an inner diameter of an end portion of said arc tube is defined by a pin that extends into said mold.

18. The method of claim 13 further comprising heating said feedstock material before injecting said feedstock material into said mold.

19. The method of claim 13 further comprising cooling said mold to increase a viscosity of said feedstock material to allow said formed arc tube to be removed from said mold.

20. The method of claim 13 further comprising heating said mold to increase a viscosity of said feedstock material to allow said formed arc tube to be removed from said mold.

21. The method of claim 13 wherein said feedstock material comprises alumina and a binder.

22. A method for forming a green ceramic arc tube for a metal halide lamp, comprising:

a) preparing a feedstock material comprising ceramic and a binder;

b) heating said feedstock material;

c) injecting said heated feedstock material into an inner cavity of a mold having an inner surface corresponding to a desired outer shape of a body of said ceramic arc tube, wherein an outer diameter of an arc discharging portion is larger than that of end portions of the arc tube which hold discharging electrodes;

d) injecting a fluid into said feedstock material to create a cavity in said feedstock material and force said feedstock material into contact with said inner surface of said mold; and e) separating said mold from the ceramic green arc tube.

23. The method of claim 22 wherein said fluid has a viscosity that is less than a viscosity of said feedstock material.

24. The method of claim 22 wherein said fluid is a liquid.

25. The method of claim 22 wherein said feedstock material is comprised of approximately 80% alumina suspended in a binder comprising approximately 18% carnauba wax and 2% stearic acid by weight.

26. The method of claim 22 wherein an inner diameter of an end portion of said arc tube is defined by a pin that extends into said mold.

27. The method of claim 22 further comprising cooling said mold to increase a viscosity of said feedstock material to allow said formed arc tube to be removed from said mold.

28. The method of claim 22 further comprising heating said mold to increase a viscosity of said feedstock material to allow said formed arc tube to be removed from said mold.

29. The method of claim 22 wherein said feedstock material comprises alumina and a binder.

* * * * *